United States Patent [19]
Bey

[11] Patent Number: 5,937,901
[45] Date of Patent: Aug. 17, 1999

[54] ROTARY NOISE ATTENUATING VALVE

[75] Inventor: Roger Bey, Illzach, France

[73] Assignee: Rotatrol AG, Cham, Switzerland

[21] Appl. No.: 08/758,372

[22] Filed: Nov. 29, 1996

Related U.S. Application Data

[63] Continuation-in-part of application No. 08/577,924, Dec. 22, 1995, Pat. No. 5,772,178.

[51] Int. Cl.$^6$ ............................. F16K 47/07; F16K 47/14
[52] U.S. Cl. ...................... 137/625.32; 251/127; 138/43
[58] Field of Search ............................. 137/625.3, 625.32; 251/118, 127; 138/42, 43

[56] References Cited

U.S. PATENT DOCUMENTS

| | | | |
|---|---|---|---|
| 4,212,321 | 7/1980 | Hulsey | 137/625.32 |
| 4,479,510 | 10/1984 | Bey | 137/625.31 |
| 4,691,894 | 9/1987 | Pyotsia | 251/127 |
| 4,774,984 | 10/1988 | Peter | 137/625.32 |
| 5,218,984 | 6/1993 | Allen | 251/127 X |
| 5,287,889 | 2/1994 | Leinen | 137/625.3 |
| 5,771,929 | 6/1998 | Boger | 137/625.32 |

FOREIGN PATENT DOCUMENTS

| | | |
|---|---|---|
| 0 621 428 | 10/1994 | European Pat. Off. . |
| 2712953 | 6/1995 | France . |
| 28 10 118 | 9/1979 | Germany . |
| 41 43 309 | 10/1992 | Germany . |
| 1283483 | 1/1987 | U.S.S.R. ................................ 251/118 |

*Primary Examiner*—John Rivell
*Attorney, Agent, or Firm*—Oblon, Spivak McClelland, Maier & Neustadt, P.C.

[57] ABSTRACT

A rotary noise attenuating valve is provided which utilizes noise attenuation technology previously utilized with linear valves. The arrangement includes an impedance assembly in which the area with the impedance assembly which is accessed by the flow downstream of a rotary closure element flow is varied upon opening of the rotary closure element, with an interface assembly disposed between the rotary closure element and the impedance assembly. As a result, benefits previously realized only in linear valves are attainable utilizing a rotary valve, while the benefits attendant to rotary valves (such as greater capacity, variable Δp and/or minimum Δp under max flow) are also attainable. Attenuator assemblies are also provided in which the attenuator or impedance structure is mounted within the valve, either downstream of the closure member, or mounted to the closure member. In a preferred form, in the more fully open positions of the valve, at least some of the flow is allowed to pass without passing through the impedance assembly.

27 Claims, 11 Drawing Sheets

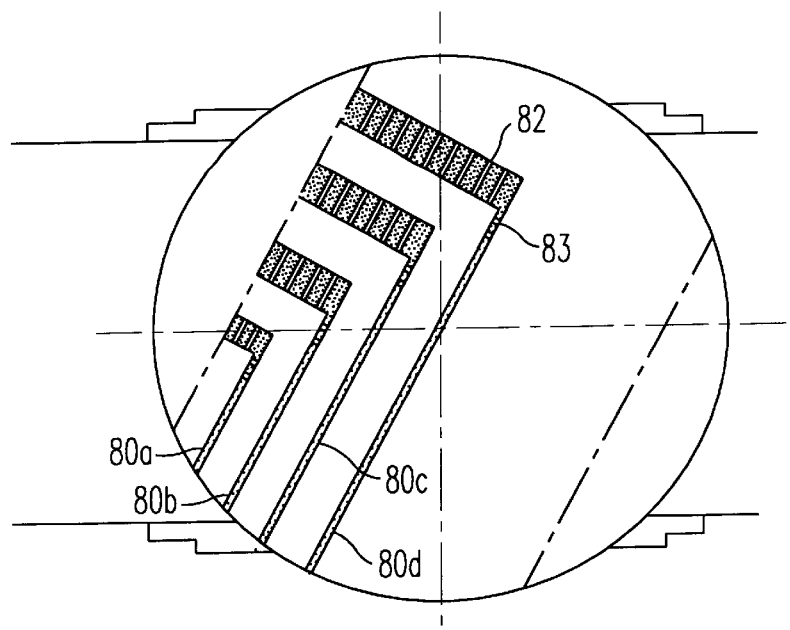
*FIG. 12A*
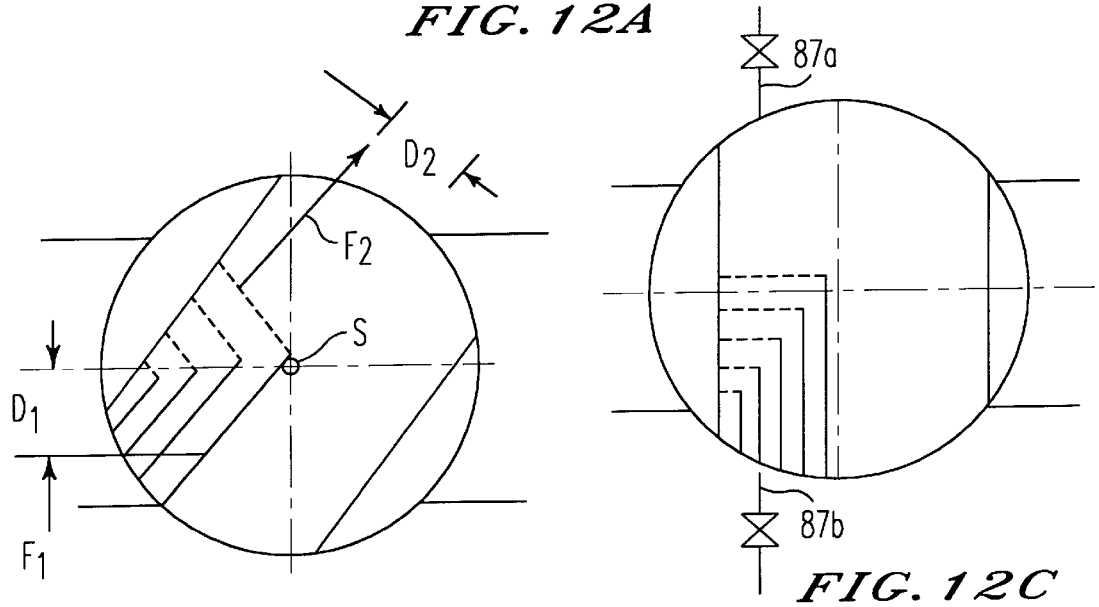
*FIG. 12B*
*FIG. 12C*
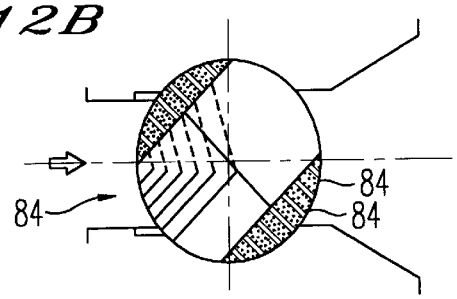
*FIG. 13*

ROTARY NOISE ATTENUATING VALVE

This application is a continuation-in-part of conceding application Ser. No. 08/577,924 filed Dec. 22, 1995 now U.S. Pat. No. 5,772,178.

BACKGROUND OF THE INVENTION

1. Field of the Invention

The invention relates to rotary noise attenuating valves, and particularly to a noise attenuating valve which includes an impedance assembly of the type previously limited to use with linear valves, with an interface or feeder assembly provided to allow the use of the impedance assembly with a rotary valve, such as a ball valve. The invention also relates to noise attenuating valves in which the impedance assembly is mounted within the valve housing, either downstream of the closure member or mounted for movement with closure member.

2. Discussion of Background

FIG. 1 shows a conventional linear valve assembly with a noise attenuation or impedance assembly. This valve is also known as a drag valve. As shown in FIG. 1, the linear valve includes an actuator assembly 10 for moving a piston 12. Disposed about the piston is an impedance assembly 14 which includes a plurality of passageways 16 extending therethrough. When the piston 12 is in the lowermost position, none of the passageways 16 is exposed to the incoming flow I. As the piston is opened (i.e., moved upwardly in the drawing figure) flow passes through the passageways 16 to provide an exit flow E, with the amount of flow varied by the position of the piston 12, which in turn varies the area or proportion of the impedance assembly which is exposed to the incoming flow.

The arrangement shown in FIG. 1 is particularly advantageous from a standpoint of reducing noise and, from a noise reduction standpoint, is superior to that available for rotary valves. However, the conventional arrangement is limited, for example, with regard to the size for which such an arrangement can be practically manufactured. For example, with piston diameters D larger than twelve inches, the arrangement is excessively expensive and can encounter instability problems.

SUMMARY OF THE INVENTION

The present invention overcomes shortcomings associated with the conventional linear impedance valve. In particular, the present invention provides an arrangement which retains the benefits of the impedance assembly associated with the linear valve, while utilizing a rotary closure element, such that the impedance assembly can be applied to larger, higher capacity valves.

In accordance with the present invention, a rotary closure element is provided, with the impedance assembly disposed at a downstream side of the closure element. A feeder or interface assembly is provided such that upon varying the degree of opening of the rotary closure element, the area within the impedance assembly which is exposed to the flow correspondingly increases. As a result, the benefits of the impedance assembly previously utilized with a linear valve are retained, and combined with the benefits associated with a rotary closure element such as a ball valve.

The impedance assembly of the present invention can be disposed downstream of the valve, or may be disposed in the valve housing. When the impedance assembly is disposed in the valve housing, it can either be downstream of the valve closure member, or mounted with the valve closure member. In a particularly preferred form of the invention, in partially open positions, the flow passes through the impedance assembly, while at the fully open or near to the fully open position (e.g., when the valve is open 45°–50° or more), a portion of the flow does not pass through the impedance assembly. Further, in accordance with one form of the invention, an impedance assembly of the present invention can be utilized in combination with a known radial passage trim (RPT), so that at lower flow or lower degrees of opening, the attenuator assembly mounted with the closure member or just downstream of the closure member is more effective, while at more fully open or higher flow conditions the RPT is more effective, such that the combination provides effective attenuation or impedance over a wide range of conditions or opening positions.

BRIEF DESCRIPTION OF THE DRAWINGS

A more complete appreciation of the invention and many of the attendant advantages thereof will be readily obtained as the same becomes better understood with reference to the following detailed description, particularly when considered in conjunction with the accompanying drawings, in which:

FIGS. 12A–C depict an embodiment in which the impedance assembly is mounted to or with the closure member;

FIG. 13 is a modified form of the embodiment of FIGS. 12A–C;

DESCRIPTION OF THE PREFERRED EMBODIMENTS

Figure 2:
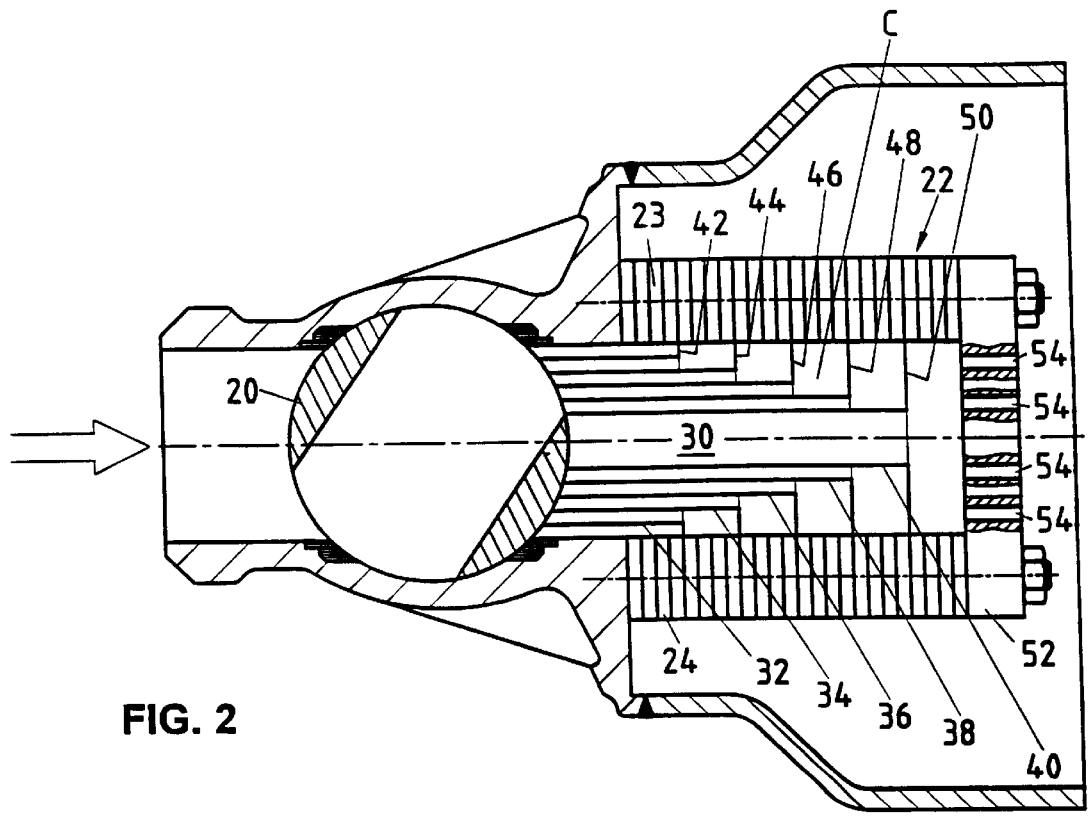
FIG. 2 is a cross-sectional view of a rotary noise attenuating valve of a first embodiment of the present invention.

Referring now to the drawings, wherein like reference numerals designate identical or corresponding parts throughout the several views, FIG. 2 is a side cross-sectional view of a first embodiment of the present invention. The valve assembly includes a rotary closure element such as a ball valve 20, which is shown in the partially open position. In addition, a resistor or impedance assembly is provided as shown at 22. The impedance assembly can be the same as that previously utilized with linear or piston type valves, and includes a wall 23 surrounding or delimiting a central cavity C, with a plurality of passageways 24 extending through the wall 23 to provide communication between the cavity C and the exterior of the impedance assembly 22. In accordance with the present invention, an interface or feeder assembly 30 is provided such that upon varying the opening of the ball valve 20, the area of the impedance assembly 22 which is exposed to the flow exiting from the ball valve 20 is correspondingly varied. In other words, as the amount of opening of the rotary closure element progressively increases, the area of the cavity and thus the number of passageways exposed to the flow also progressively increases.

In the embodiment shown in FIG. 2, the interface assembly 30 includes a plurality of channels ("channels" utilized herein to avoid confusion with the reference to the passageways of the impedance assembly), and the number of channels through which fluid flows increases as the closure element 20 is opened. Preferably, the portion of the interface assembly adjacent to the closure element will have a shape corresponding to the closure element (e.g., a spherical concave shape for a ball valve) so that access to the channels of the interface assembly is controlled, and the number of channels through which flow passes progressively increases as the closure element is progressively opened.

With the interface assembly 30 of FIG. 2, access of the fluid to the impedance assembly 22 is varied along a length direction of the impedance assembly (with the length direction extending from left to right in the drawing figure), such that when the closure element is initially opened, only the passageways 24 of the left portion of the impedance assembly are accessed by the fluid. As opening of the closure element progresses, the flow progresses along the length of the impedance assembly, thereby increasing the area of the inner wall of the impedance assembly (and thus the number of passageways) exposed to the flow. Thus, with regard to the flow of the fluid through the impedance assembly, the flow passes through the impedance assembly 22 in a manner similar to that of the linear or piston assembly discussed earlier with reference to FIG. 1, however the flow is controlled utilizing a rotary closure element such as a ball valve.

Figure 3:
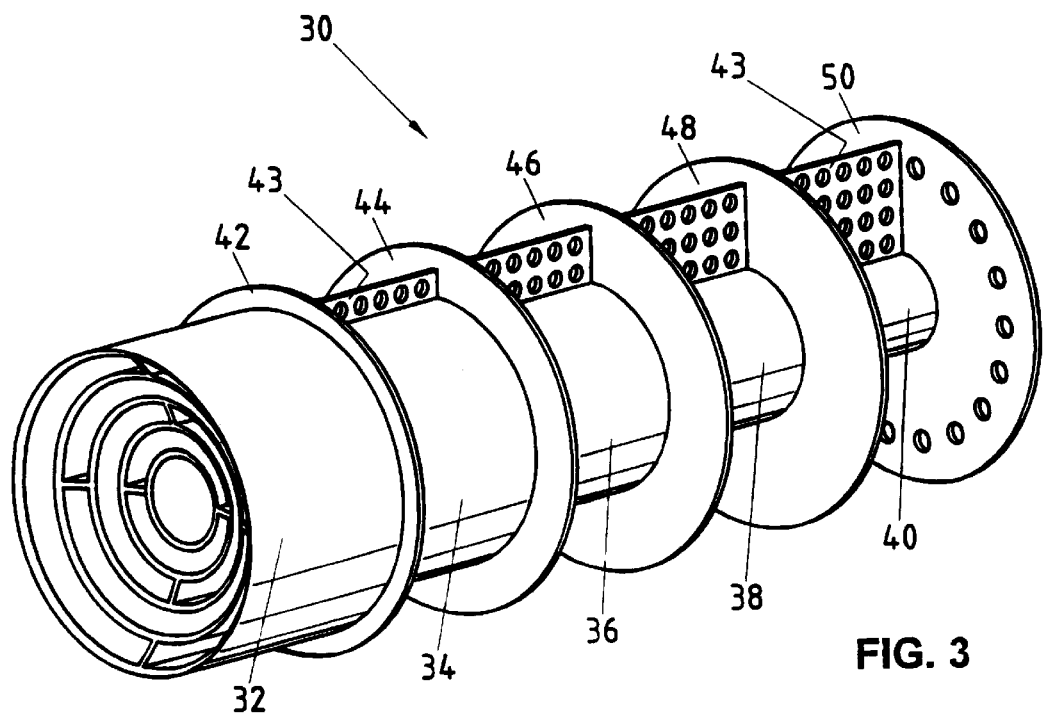
FIG. 3 is a perspective view of the feeder or interface assembly of the embodiment of FIG. 2.

Referring now to FIG. 3, the interface assembly of FIG. 2 will be described in further detail. As shown in FIG. 3, the interface assembly includes a plurality of nested tubular members 32, 34, 36, 38, 40, with the upstream-most tubular member having the largest diameter, but the shortest length. In addition, a plurality of end plates are provided as shown at 42, 44, 46, 48 and 50. When the closure element is initially cracked open, the flow will initially pass around the exterior of the first tubular portion 32, while the first end plate 42 prevents the flow from passing further in the length or axial direction of the impedance assembly, such that the flow will then pass only through the passageways 24 upstream of the plate 42. Thus, only a first length portion of the inner wall of the cavity is exposed to the flow.

Continued opening of the closure element 20 will result in the flow additionally passing between the tubular member 32 and the tubular member 34, with the end plate 44 preventing the flow from passing further in the axial direction within the cavity C, such that the flow passes from the cavity C through the impedance assembly 22 at only locations upstream of the plate 44. As the closure element 20 is progressively opened, the length of the impedance assembly 22 which is exposed to the flow increases, thereby increasing the number of passageways 24 which are exposed to the flow in the length direction of the impedance assembly.

Figure 1:
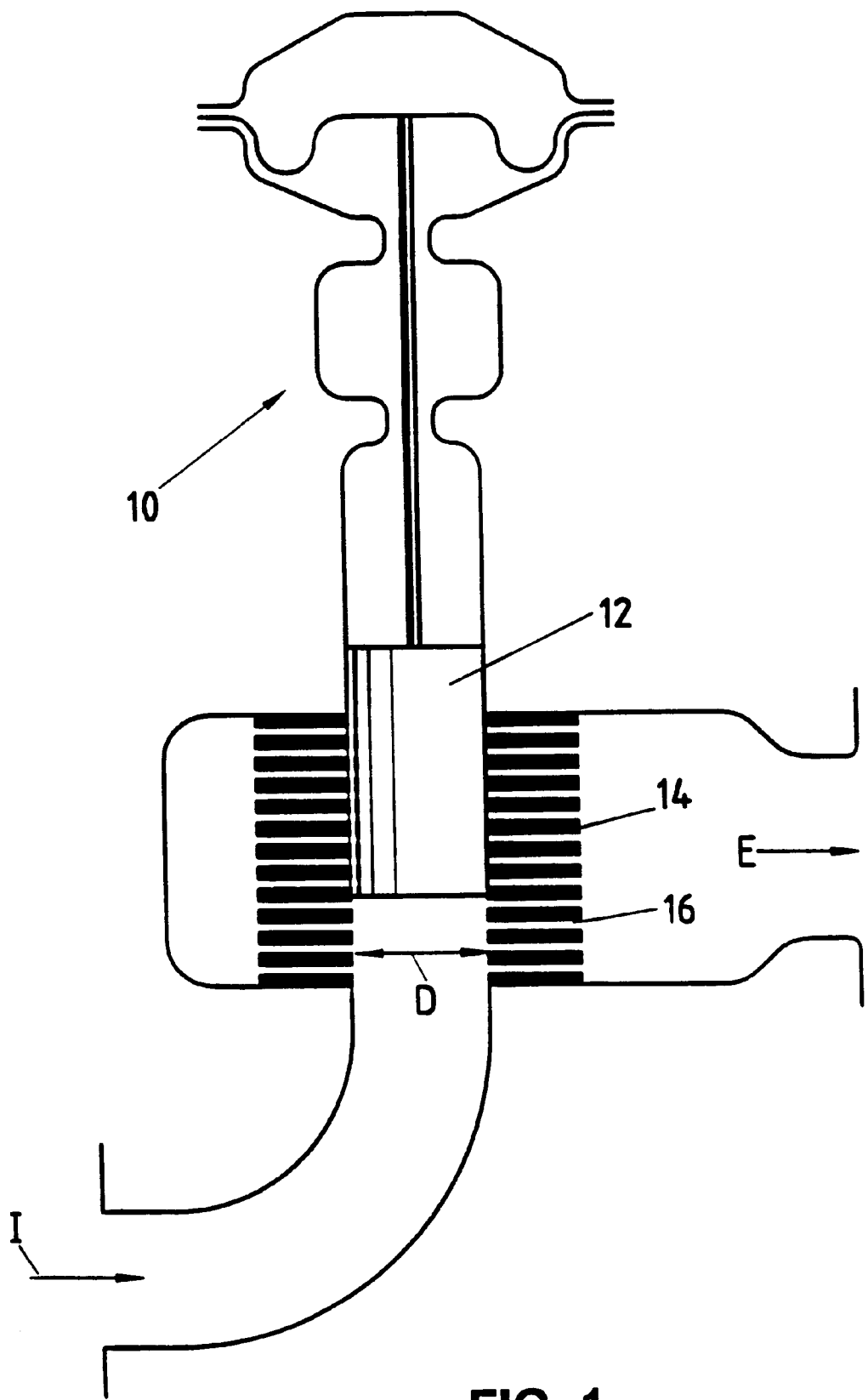
FIG. 1 depicts a conventional linear valve with noise attenuation.
Figure 4:
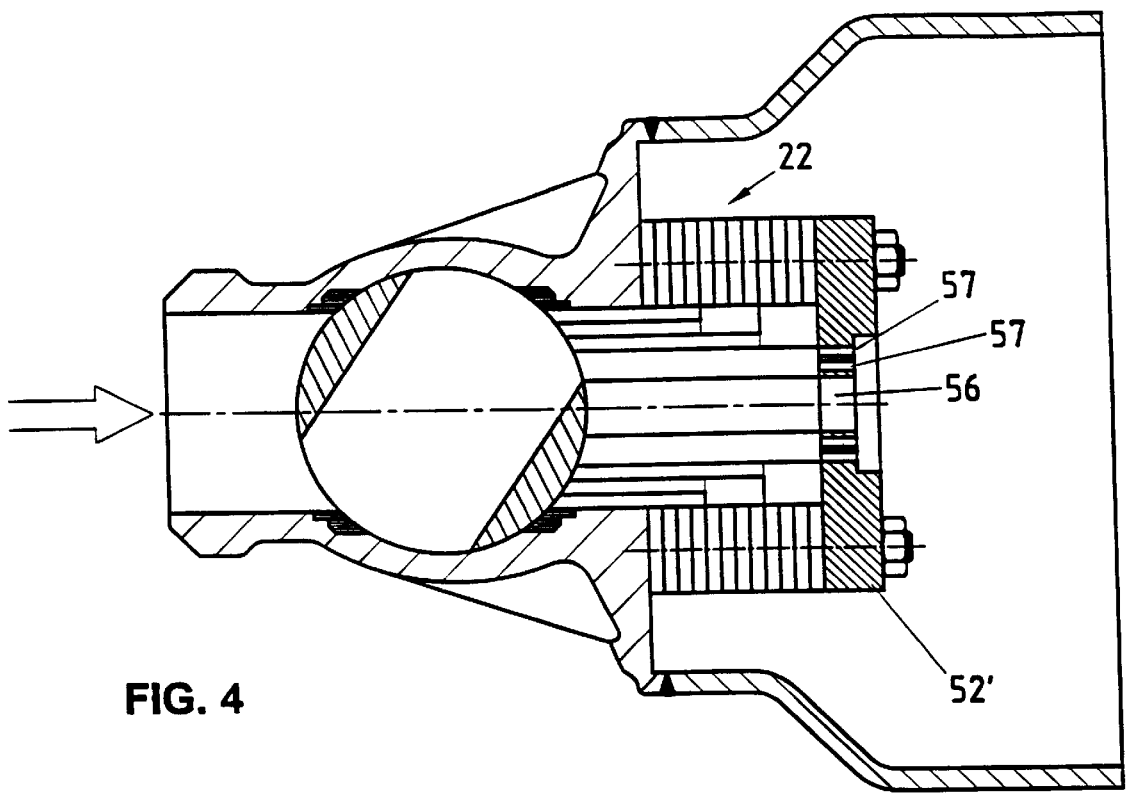
FIG. 4 is a cross-sectional view of the FIG. 2 embodiment, with a modified impedance end plate or cover plate closing an end of the impedance assembly.

At the downstream end of the impedance assembly, a cover plate 52 is provided (FIG. 1, "cover plate" utilized here to avoid confusion with the end plates previously described). The cover plate 52 can be completely closed, or can include perforations as shown at 54. Alternatively, as shown in FIG. 4, the cover plate 52' of the impedance assembly 22 can provide for a direct communication or direct flow from the closure element through the interface assembly to the downstream side of the interface assembly without passing through the wall (or walls) of the impedance assembly 22. In particular, as shown in FIG. 4, the cover plate 52' can include an opening 56 which allows for a more direct flow as the closure element moves toward the fully opened position, thereby providing for a larger maximum flow. Further, if desired, prior to or at the fully opened position, the cover plate 52' can provide an impeded flow, for example, by providing a perforate structure 57 associated with the channel or channels of the interface assembly accessed at, or prior to, the fully opened position. As should be readily apparent, in addition to retaining the benefits of the impedance assembly previously utilized in linear valves, the present invention further enhances the flexibility (i.e., structural variations possible) in using the impedance assembly beyond that possible with prior linear valves, since the piston of the linear valve blocked any flow through an axial end of the impedance assembly. With the present invention, the cover plate can provide a blocked (closed) end flow, an open end flow, or a perforate (baffle) impeded end flow. Thus, with the present invention it is possible to provide a stack feeder (or interface assembly) combined with a cover plate opening and/or baffle structure, which can be desirable for larger maximum flows, and for varying capabilities with regard to the desired pressure drop across the valve assembly for various applications. As in the FIG. 2 embodiment, with the arrangement shown in FIG. 4, when the valve is initially opened, the flow passes through only a portion of the walls of the impedance assembly 22, and as the closure element is progressively opened, the length of the impedance assembly 22 which is accessed by the flow increases.

Although tubular/cylindrical/disk configurations and shapes are shown for the interface and impedance assemblies of FIGS. 2–4, with the cavity C of the impedance assembly cylindrical, it is to be understood that other shapes are possible. In addition, while the channels defined by the interface assembly are depicted as symmetrical and concentric, off-center or eccentric arrangements are also possible.

Figure 5:
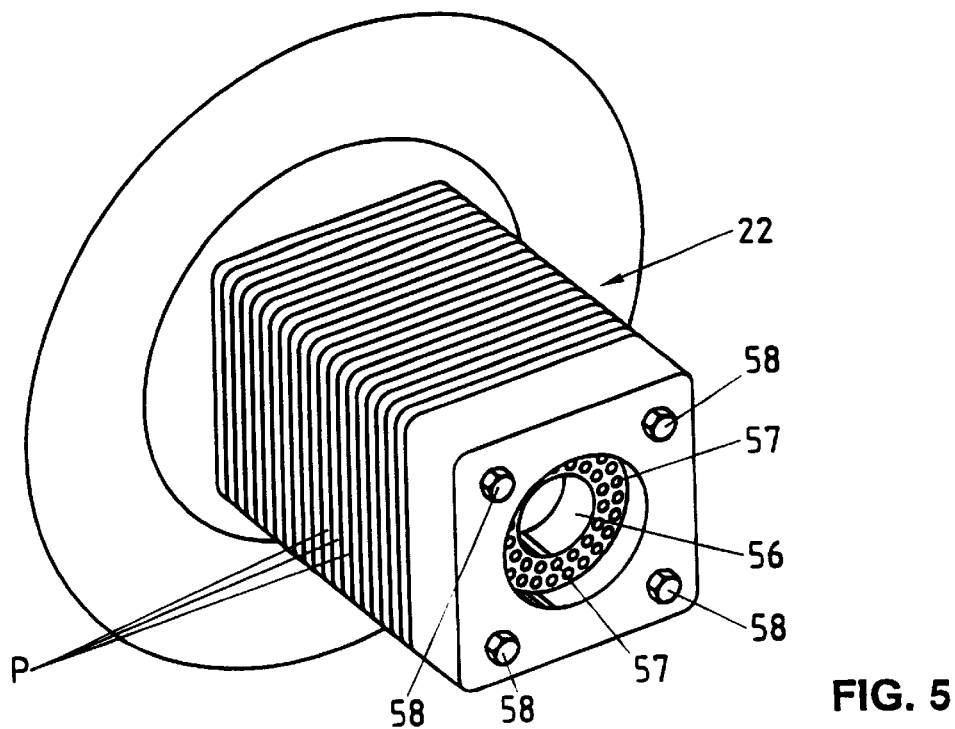
FIG. 5 is a perspective view of an example of an impedance portion which can be utilized in the valve assembly of the present invention.

FIG. 5 is a perspective view of a resistor package or impedance assembly having rectangular outer shapes and having a cover plate 52' as shown in FIG. 4. As shown in FIG. 5, an unobstructed or direct flow portion can be provided (by passageway 56) which directly communicates with the closure element (i.e., a portion of the flow passes through 56 without passing through the walls of 23 of the impedance assembly 22). In addition, baffles or perforations can be provided as shown at 57.

If desired, the open passageway 56 could be positioned at a lower portion of the interface assembly and impedance assembly. In addition, if desired the upper portions (i.e., upper with respect to FIGS. 2 and 4) of the impedance assembly can be isolated from the lower portions (e.g., by dividers extending along the interface assembly), so that the lower portions of the impedance assembly are not accessed until a greater amount of opening of the closure element is achieved. With this arrangement (utilizing dividers) combined with a lower direct opening passage in the cover plate, the direct flow portion is not encountered until after a greater degree of opening of the closure element as compared with the arrangements shown in FIGS. 2–4. More particularly, with the impedance assembly shown in FIGS. 2–4, dividers or spacers (e.g., as shown at 43 in FIG. 3) required for structural support and spacing of the tubular elements allow the flow to pass circumferentially therethrough, e.g., by utilizing perforate supports or other open structures. Thus, a length portion of the impedance assembly is exposed to the flow about the circumference or periphery of that length of the assembly at substantially the same time. However, non-perforated dividers or spaces could also be utilized and disposed at locations such that upper and lower regions of a particular length portion are accessed at different times.

Figure 9A:
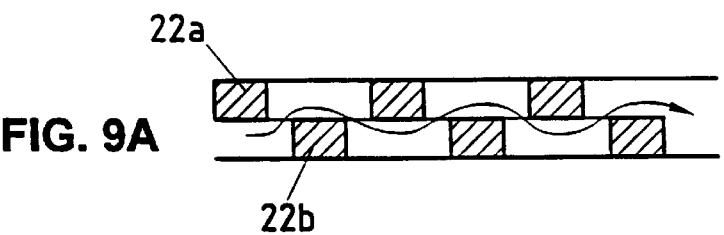
FIGS. 9A and 9B depict arrangements which can be utilized for the resistor or baffle structure extending through the walls of the impedance assembly.
Figure 9B:
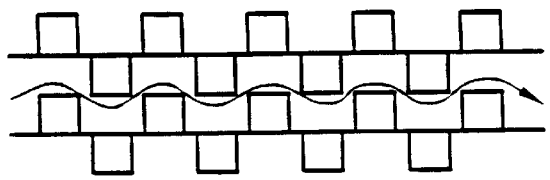

As also shown in FIG. 5, the impedance assembly 22 can be formed of a plurality of plates P which are stacked and held together by bolts 58. Referring briefly to FIGS. 9A and 9B, examples of plate structures which provide the passageways or impedance structures of the impedance assembly 22 are depicted. As shown in FIG. 9A, the impedance assembly can be formed by plates 22a, 22b having apertures therethrough, with the apertures offset, such that the flow alternates between the plates as the flow passes through the passageways of the impedance assembly, i.e., from the internal cavity, through the walls 23 and outside of the impedance assembly 22. Alternately as shown in FIG. 9B, the plates can have a toothed or baffle structure providing a tortuous passageway through which the flow travels as it passes through the walls of the impedance assembly 22. Of course, the impedance assembly is not limited to these arrangements, and could also be formed of, e.g., a cast or machined structure (rather than plates) in which passageways are machined through the walls of the impedance assembly. Simpler passageways through the walls, such as a perforate structure or straight through holes, can be performed by conventional machining, while more complex structures could be formed by, e.g., electrical discharge machining.

Figure 6:
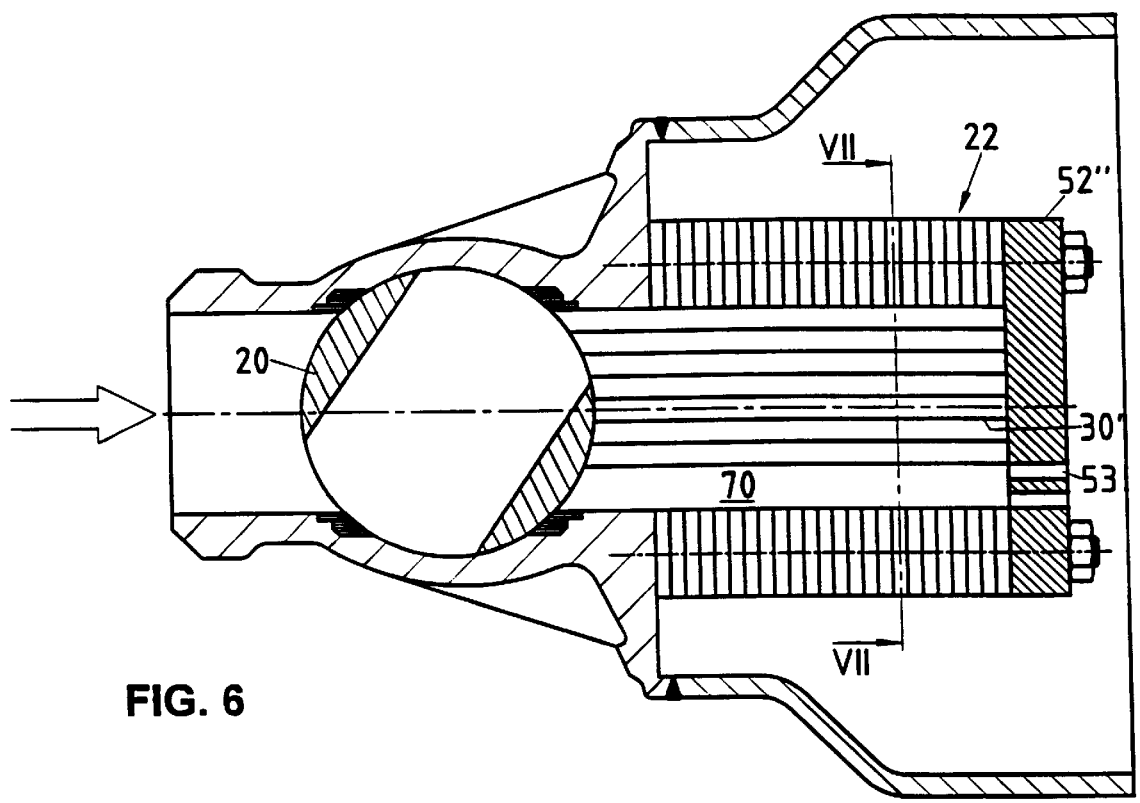
FIG. 6 is an alternate rotary noise attenuating valve of the present invention.
Figure 7:
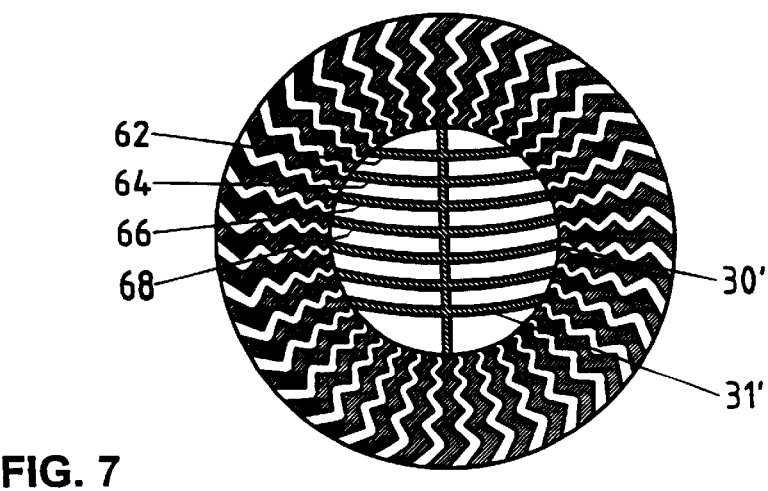
FIG. 7 is a sectional view along section VII—VII of the FIG. 6 embodiment.
Figure 8:
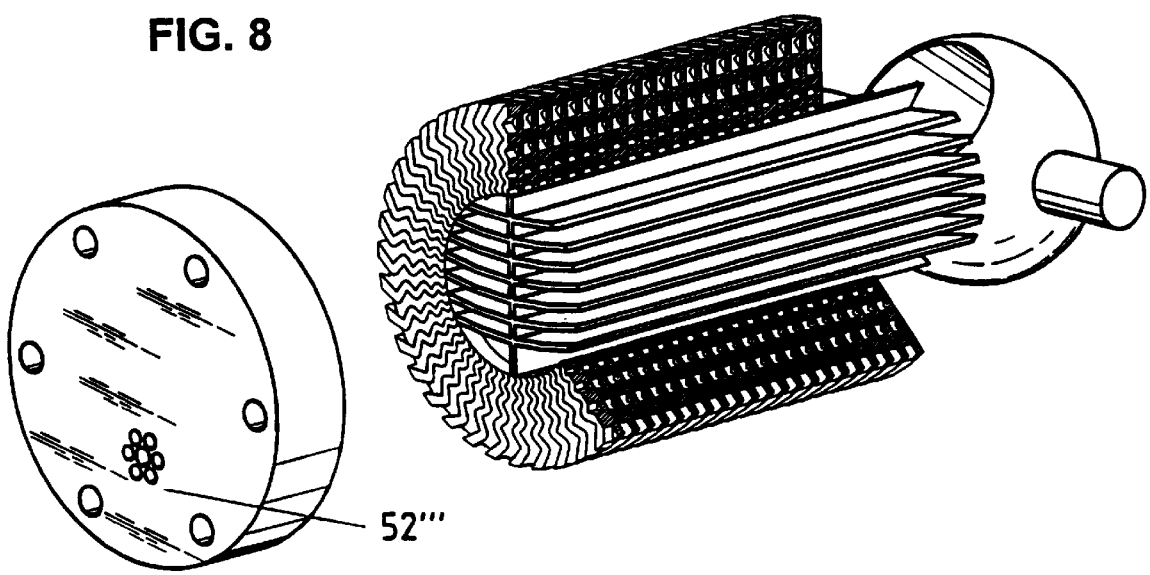
FIG. 8 is a perspective view of the FIG. 6 embodiment, with an optional baffle plate utilized as the cover plate for the impedance assembly.

Referring now to FIG. 6, an alternate embodiment of the present invention is shown. In the arrangement of FIG. 6, rather than varying the length of access to the impedance assembly as the closure element 20 is opened, the peripheral or circumferential access to the impedance assembly 22 is varied. In particular, as shown in FIG. 7, the impedance assembly 30' includes a plurality of dividers 62, 64, 66, etc. Each of the dividers 62, 64 . . . , restrict the flow to a peripheral portion of the impedance assembly 22, with the flow halted in the length or axial direction of the impedance assembly by the cover plate 52". With this embodiment, each of the channels of the interface assembly extend along the length of the impedance assembly, however the channels access different portions of the inner periphery of the walls 23 of the impedance assembly 24. As in the embodiment discussed earlier, the cover plate 52" can be fully closed, or may include an opening 53 or perforations, which allow flow to pass from the rotary closure element without passing through the walls of the impedance assembly 22. As the closure element 20 is initially opened, the flow will pass only above the first divider 62 of FIG. 7, such that the flow accesses only the inner peripheral portion of the impedance assembly 22 which is above the first divider 22. As the closure element continues opening, the portion of the inner periphery above the divider 64 will additionally be accessed, with continued opening successively then accessing the inner peripheral portions associated with the divider 66, 68, etc. Finally, in the full open position, the entire periphery of the impedance assembly is accessed and, if desired, an open portion of the cover plate 52" can be associated with one of the channels 70 (FIG. 6) when the closure element is in the full open position. Of course, if desired, a direct flow opening can be disposed in the cover plate at a location corresponding to a divider before the full open position, or a baffle structure can be associated with the cover plate. FIG. 8 is a perspective view of the arrangements shown in FIGS. 6 and 7. As discussed earlier, if desired, a baffle plate structure or perforated plate can be provided as the cover plate for the impedance assembly as shown at 52'".

As should be readily apparent from the foregoing, the present invention provides a rotary valve assembly which allows the use of an impedance assembly previously utilized only in linear or piston type valves. Thus, the benefits of a linear impedance assembly are realized in the context of a rotary valve assembly (allowing for greater capacity, variable Δp and/or minimum Δp conditions with max flow). Further, the capabilities of the impedance assembly can be expanded beyond that utilized in linear valves, since the cover plate or axial end of the impedance assembly can also be modified as desired.

Figure 10A:
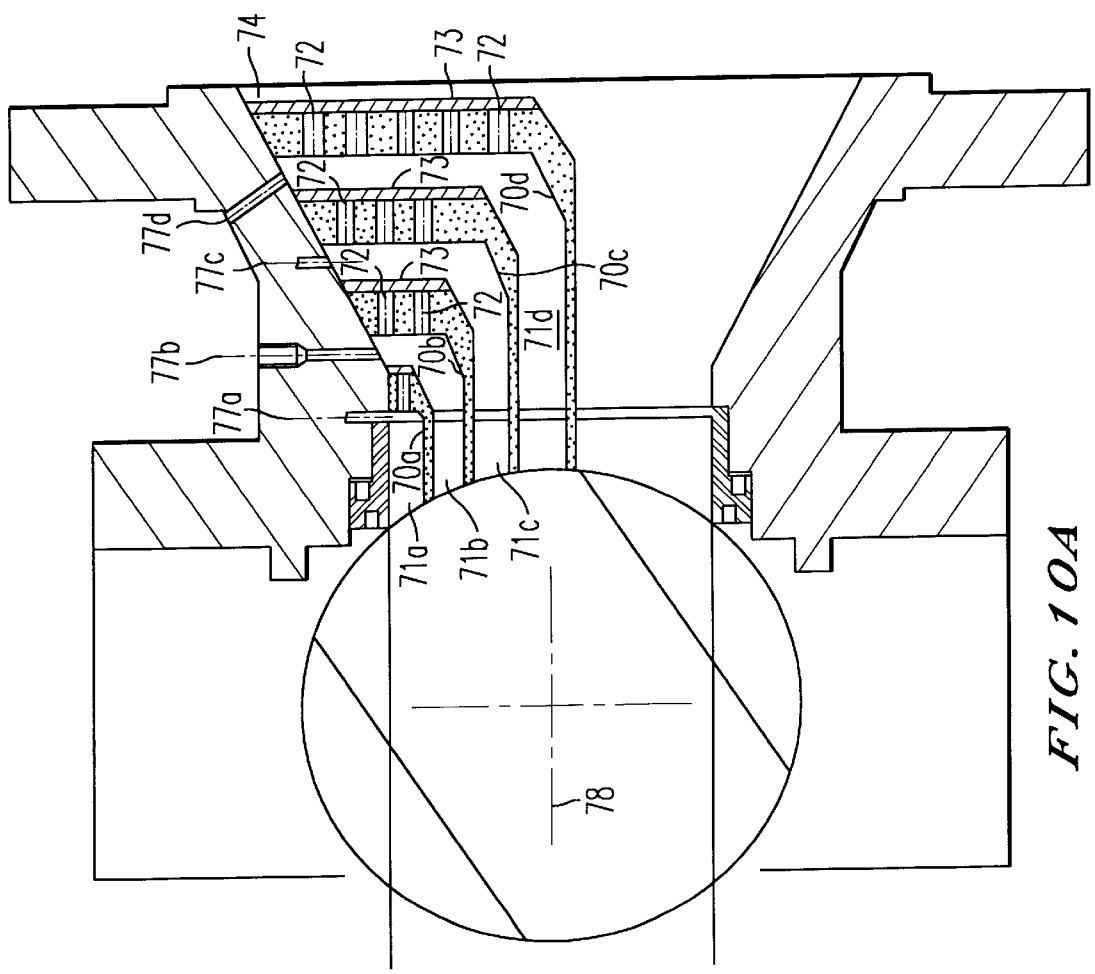
FIGS. 10A–D depict a further embodiment in which the impedance assembly is disposed downstream of the closure member, but within the valve housing.

FIGS. 10A–10D depict a further embodiment of the present invention, in which the impedance or attenuator assembly is disposed downstream of the valve closure member, but within the valve housing. As shown in FIG. 10A, the arrangement can include plural L-shaped attenuator members 70a–70d, (i.e., L-shaped when viewed in cross-section as shown in FIG. 10A), which respectively define passageways 71a–71d. As the valve is initially opened, the flow passes into the passageway 71a, and with greater amounts of opening, the flow then additionally passes through the passages 71b, 71c, . . . . At the downstream side of each of the attenuator or impedance structures 71a–d, a downstream portion is provided which extends transverse to the direction of flow, and which has a plurality of openings 72 extending therethrough. An additional plate 73 can optionally be disposed downstream of the openings of one or all of the attenuator structures 70a–70d. This additional optional plate is utilized depending upon the application, and provides additional impedance downstream of the attenuator structures 70a–70d. The optional plate 73 can have a different number of openings than the openings 72 of each of the structures 70a–70d and/or may have openings of a different size as compared with the openings 72. In addition, the plate 73 could be movably mounted for a variable impedance effect in order to vary the amount of the openings 72 which are exposed to the downstream side of the valve assembly. The optional plate 73 can have the same size and shape as the downstream side of the structures 70a–70d, and can be pinched or welded to the structures 70a–70d. Where the plate 73 is utilized as a variable resistor, it may be slidably or pivotably/rotatably disposed with respect to the downstream end (i.e., the semicircular portion shown in FIG. 10B) of the structures 70a–70d, and can have the same or a different shape as compared with the downstream end of the structures 70a–70d.

Figure 10B:
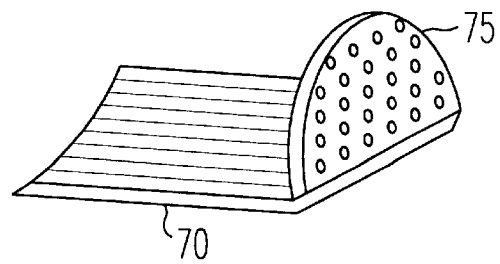

FIG. 10B depicts a perspective view of one of the attenuator structures 70a–70d, with the structure of FIG.

Figure 10C:
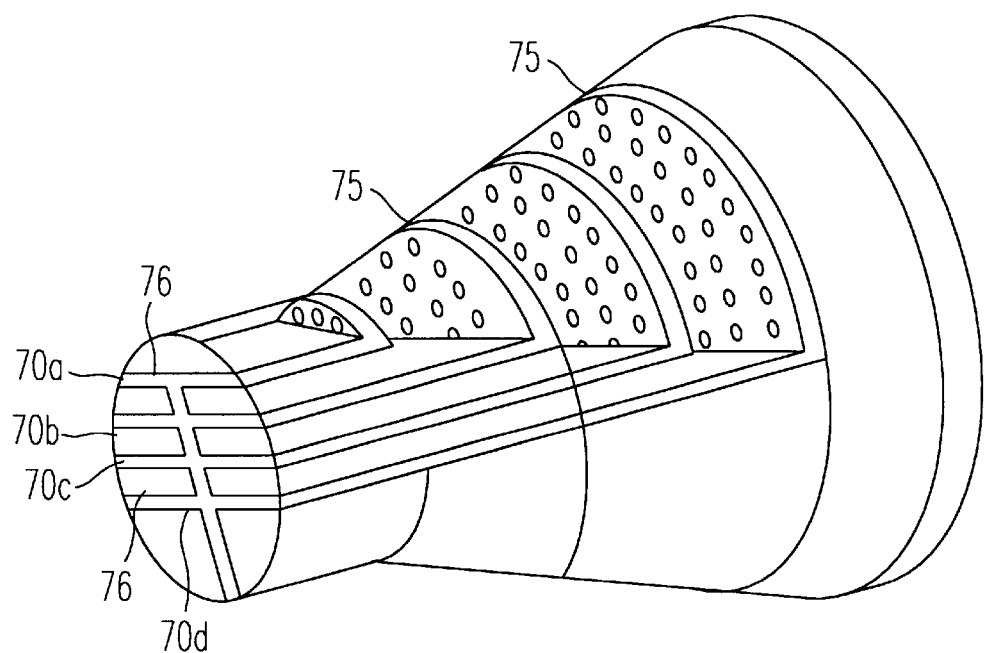

10B generically labeled 70. FIG. 10C is a perspective view of an assembly of the structures 70a–70d. As can be appreciated from FIGS. 10A–10C, the downstream ends of the structures 70a–d have semicircular peripheries, so that the upper periphery abuts against or mates with the inner periphery of the downstream side of the valve housing. The upper periphery 75 can thus be welded to the interior of the downstream side of the valve housing. Of course, various alternate mounting expedients are also possible. Thus, at least for a range of throttling positions of the valve, the flow passes into the channels 71a–d and flows through the openings 72 of the downstream ends of the structures 70a–70d. As also shown in FIG. 10C, a vertical wall 76 can extend between the structures 70a–70d for support. Of course, a variety of support structures can be utilized for sufficient structural integrity.

Figure 10D:
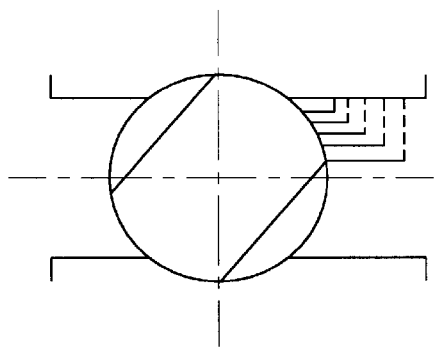

FIGS. 10A–10C depict structures 70a–70d in a valve in which a diffuser or expansion area is provided at the downstream end of the valve. However, it is to be understood that this arrangement is also applicable to full bore valves or valves in which an expansion or diffuser area is not provided at the downstream side of the valve housing as shown in FIG. 10D. In accordance with a further aspect of the arrangements of FIGS. 10A–10D, as shown in FIG. 10A, additional flushing ports 77a–77d can be provided so that, when the closure member is in the closed position, the ports 77a–77d can be connected to a fluid source (a liquid or gas) for flushing the attenuator structures to thereby clean the attenuator structures. Preferably, the ports 77a–77d extend through the valve housing to a location at which the ports can be conveniently connected to a fluid source.

As should be readily apparent from FIGS. 10A–10D, the attenuator structures are provided so that at least until the valve is open to, e.g., a 45°–50° position, the flow passes primarily or entirely into the channels 71a–71d defined by the attenuator structures 70a–70d. If desired, additional attenuator structures can be provided so that the flow passes through attenuator structures at even greater degrees of opening. This can be accomplished by providing additional structures which extend upwardly to the top of the valve housing, by providing attenuator structures having downstream ends which extend downwardly to the bottom of the valve housing (for example by providing attenuator structures which are the mirror image of the structures shown in FIG. 10A with respect to the axis or plane indicated at 78), and/or by providing structures in which the downstream end (i.e., the end having openings therethrough) extends upwardly and is more fully circular. However, the arrangement shown in FIGS. 10A–10D is particularly preferred, at least for many applications, in that, after the valve is opened a sufficient amount (e.g., 45°–50°) at least some of the flow is allowed to pass through the valve without passing through the attenuator structures 70a–70d. Thus, at more fully open positions, at which the pressure drop across the valve is typically lower, better capacity is achieved, while at the less fully open or throttling positions, where the pressure drop can be greater, the attenuator or impedance structures are more effectively utilized.

Figure 11:
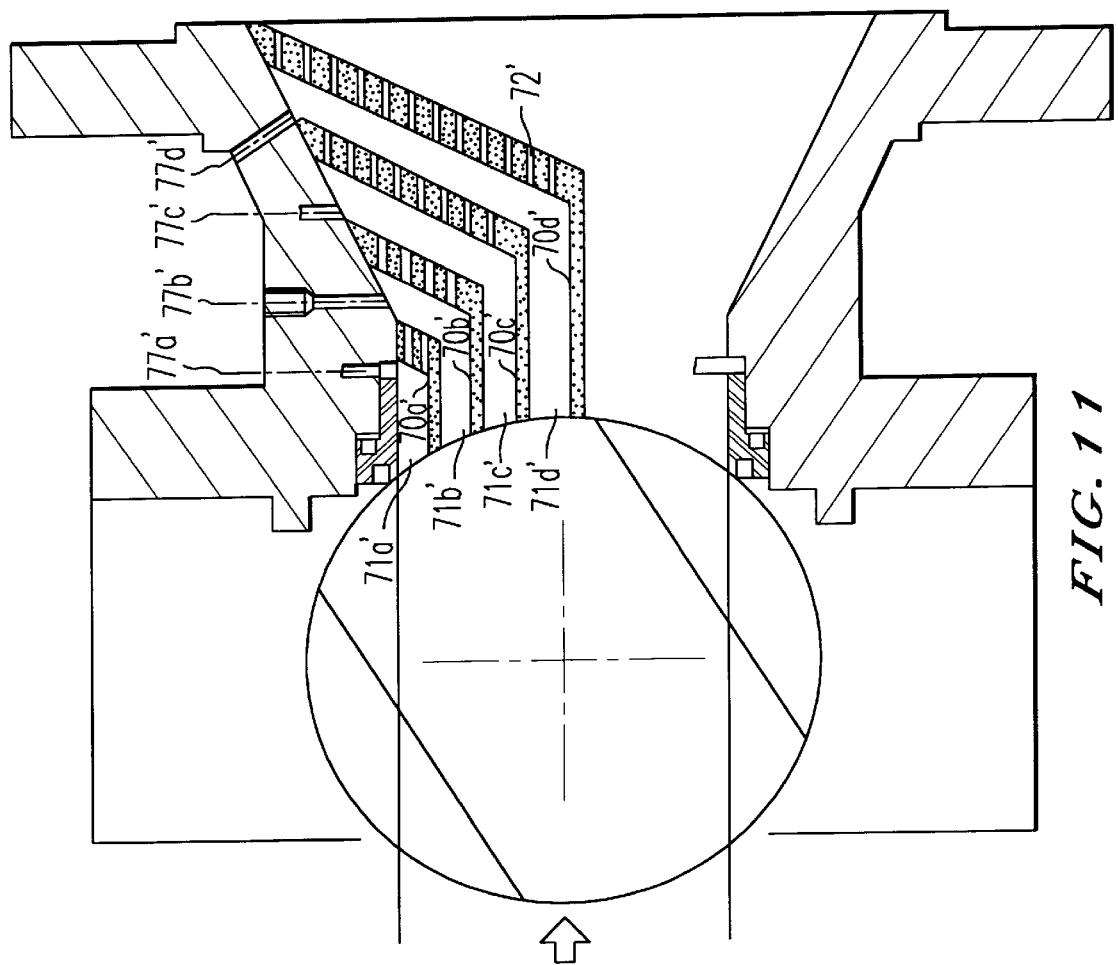
FIG. 11 depicts a modified form of the embodiment of FIGS. 10A–D.

Turning briefly to FIG. 11, a modified form of the invention is shown in which corresponding elements are designated with primed numerals. As shown in FIG. 11, the downstream ends of the attenuator structures 70a'–70d' can be inclined with respect to the flow direction. This arrangement is advantageous in that a greater area is provided on the downstream ends of the attenuator structures, thus providing a greater area for the perforations or openings 72' (so that a greater cummulative area of the openings can be provided), to provide greater capacity in the throttling positions. Of course, it is also to be understood that the upstream and downstream ends of the attenuators 70a–70d, 70a'–70d' may have shapes other than the planar shapes shown in FIGS. 10 and 11. For example, the upstream ends may be curved or may include combinations of curved or flat or angled segments. As in the embodiment of FIGS. 10A–D, the downstream portions of the impedance structure 70a'–70d' are preferably substantially semicircular or may appear more elliptical due to the angling of the downstream ends.

Referring now to FIGS. 12A–12C, a further embodiment of the present invention is shown in which the attenuator structure is mounted with or to the closure member. This can be achieved by, e.g., welding structures having a shape similar to that shown in FIGS. 10 and 11 to the interior of a bore of a full ball closure member, by other mounting methods, or by coating or machining techniques in forming the closure member. In addition, as with the arrangements of FIGS. 10 and 11, support structures can be provided between the attenuator structures and/or between the closure member and the attenuator structures. The attenuator structures and closure member can also be cast together. As shown in FIG. 12A, the attenuator structures 80a–80d present a series of channels, with the number of channels accessed depending upon the position of the valve, such that for greater degrees of opening, the upstream ends of a greater number of attenuator structures are accessed. However, as with the embodiments of FIGS. 10 and 11, after the valve is open a sufficient amount (e.g., after 45° or 50°) at least some of the flow is allowed to pass through the valve without passing through one of the attenuator structures 80a–80d. As also shown in FIG. 12A, in addition to openings 82 on the downstream side (i.e., the downstream side when the valve is in the fully open position) of the attenuator structures 80a–80d, openings can also be provided in the upstream portions as shown at 83.

The mounting or positioning of the attenuator structures with the closure member can be advantageous in that the impedance varies with the varying degree of opening of the closure member. In addition, by virtue of the transversely extending downstream portions of the attenuator structures, a balancing of the torque or moment forces is achieved. More particularly, as shown in FIG. 12B, the flow directed upon the upstream sides of the attenuator structures produces a resultant force represented at $F_1$ at a moment arm distance $D_1$ about the stem of the valve (the axis of the stem is schematically represented at S). In addition, the flow impinging upon the downstream sides of the attenuator structures produces a resultant force represented at $F_2$ at a moment arm distance $D_2$. These forces, at least in part, offset one another, so that the result of the flow onto the attenuator structures does not unduly burden the actuator utilized in moving or maintaining the valve at various positions. Of course, it is to be understood that the forces $F_1$, $F_2$ and the moment arm distances $D_1$ and $D_2$ are provided for illustrative purposes, and the magnitudes and locations of the resultant forces will vary depending on the geometry of the attenuator structures and the flow conditions.

As shown in FIG. 12C, the arrangement of FIG. 12A can also be provided with flushing ports above and below the valve as represented at 87a, 87b, so that, when the valve is closed, a flushing or cleaning operation can be accomplished by feeding a fluid through port 87a, and draining through port 87b. In the arrangement of FIG. 12C, the flushing operation is assisted not only by the pressure of the fluid entering at 87a, but also by gravity.

FIG. 13 shows a further variation of the arrangement of FIGS. 12A–C. In the arrangement of FIG. 13, in addition to the attenuator structures 80, openings can be provided through the downstream side of the ball closure member (i.e., the downstream side when the closure member is in the closed position) as indicated at 84. The openings 84 provide additional division of the pressure drops or additional impedance in the partially open positions.

Figure 14:
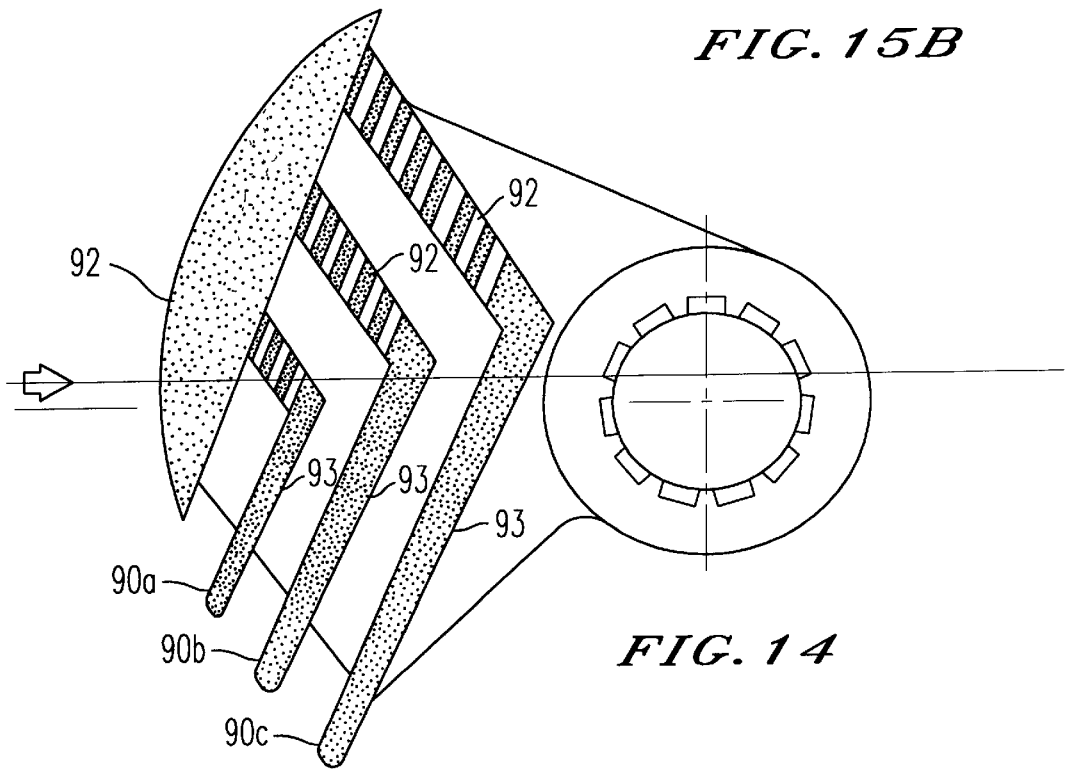
FIG. 14 depicts an embodiment in which the impedance assembly is mounted to a segmented closure member.

FIG. 14 depicts a further variation of the present invention, in which the attenuator structures 90a–90c are associated with a segmented closure member 92. As with the earlier embodiments, the attenuator structures 90a–90c can be welded to the closure member 92 or can be cast or otherwise mounted together with the closure member. In addition, as with the arrangement of FIGS. 12 and 13, the arrangement of FIG. 14 can be advantageous in that the effect of the forces resulting from the flow impinging upon the upstream and downstream sides of the attenuator structures 90a–90c at least partially offset one another to provide a torque balancing effect. In addition, as with the earlier embodiments, openings 92 are provided on the downstream sides of the structures 90a–90c (i.e., downstream when the valve is in the open position), however openings may optionally be provided on the upstream sides (indicated generally at 93) as well.

Figure 15A:
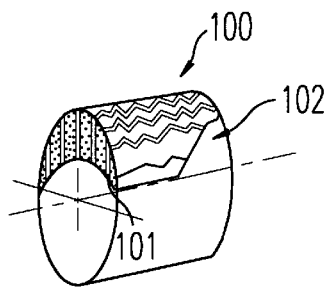
FIGS. 15A–C depict a further embodiment in which the impedance assembly is mounted within the valve housing and downstream of the closure member.
Figure 15C:
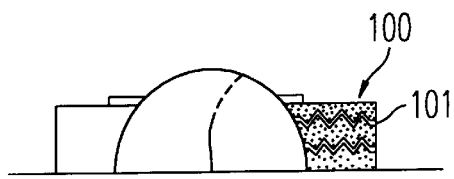
Figure 15B:
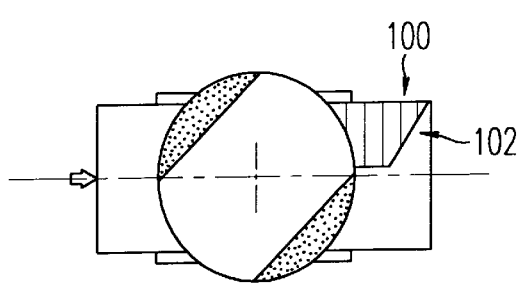

FIGS. 15A–C depict an alternate embodiment of the present invention in which an attenuator structure is disposed as a "nose" structure 100 which is downstream of the closure member, but preferably within the valve housing. The attenuator structure 100 has a "nose" shape in that the downstream end is tapered. FIG. 15A is a perspective view of the attenuator structure 100, while FIG. 15B is a schematic representation of a side view of the closure member and the attenuator structure, and FIG. 15C is a top view of one-half of the arrangement of this embodiment in which the closure member is in the position shown in FIG. 15B. In this embodiment, the impedance or attenuator assembly includes plural passageways 101 extending therethrough. The passageways can be, for example, tortuous or nonlinear if desired as shown particularly in FIGS. 15A and 15C. As shown in FIG. 15C, the upstream side of the attenuator structure 100 can also be curved, and may be spherical concave if desired, to provide better mating with the closure member.

As should be readily apparent from FIGS. 15A–15C, as in the earlier embodiments, with this arrangement attenuation is particularly effective for smaller degrees of opening, while at larger degrees of opening at least some of the flow is allowed to pass through the valve without passing through the attenuator structure 100. Moreover, in addition to increasing the number and/or area of passageways 100 through which flow passes as the valve is amount of opening increased, by virtue of the scalloped or tapered end 102, the length of the passageway or passageways decreases so that there is less impedance for these shorter passageways as the valve is opened to, for example, the position shown at FIG. 15B. Thus, for a small amount of opening (i.e., smaller than that shown in FIG. 15B) the flow must pass through a longer more tortuous passageway and thus encounters greater impedance, while as the valve is opened by an amount as shown in FIG. 15B, at least some of the flow encounters a shorter passageway or a lower amount of impedance.

Figure 16A:
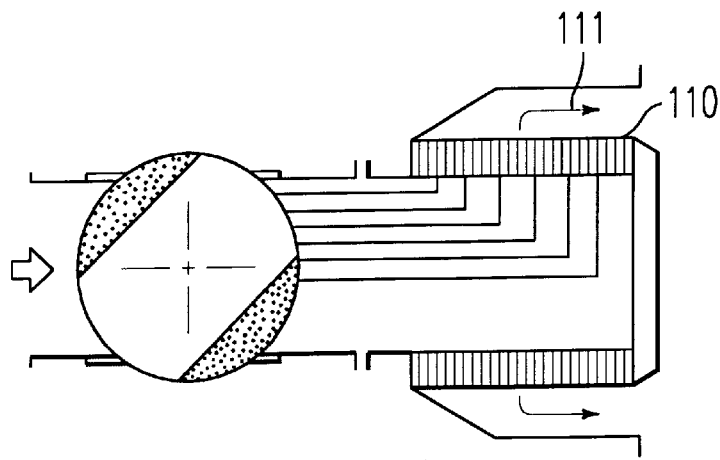
FIGS. 16A and B depict impedance assemblies in combination with a radial passage trim.
Figure 16B:
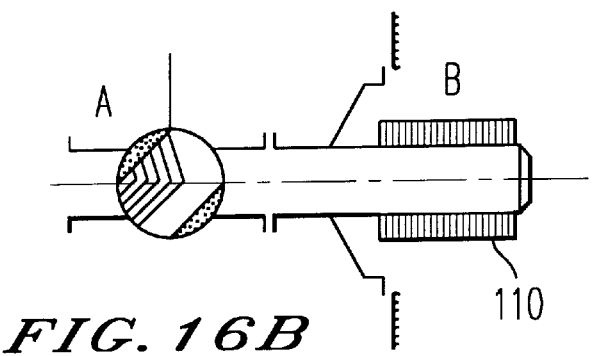

Turning now to FIGS. 16A and 16B, a further advantageous arrangement or use of the present invention is shown. The arrangements of FIGS. 16A and 16B utilize arrangements of the present invention as described earlier in addition to a downstream attenuator, such as a conventional radial passage trim (RPT) 110. In the conventional RPT structure 110, the flow passes radially outwardly through the RPT 110 as indicated by arrows 111. However, the structures of FIGS. 16A and 16B additionally utilize impedance structures in which the impedance varies depending upon the amount of opening of the valve, with the FIG. 16A arrangement utilizing an attenuator structure similar to that shown in FIG. 10D, and the arrangement of FIG. 16B utilizing an attenuator structure as shown in FIG. 12. Typically, RPT attenuator structures 110 are most effective in more fully open positions in which the downstream demand is great. While the RPT structures are effective in attenuating noise or in dividing the pressure drop across the valve, they can be disadvantageous in that they are not capable of providing varying impedance levels and/or they are less effective at partially open positions or throttling positions of the valve. With the arrangements of FIGS. 16A and 16B, the variable impedance effects of the present invention are combined with the RPT structures, so that advantageous impedance is provided at throttling positions of the valve as well as at more fully open positions. If desired, a modified RPT structure can be provided so that a downstream end has one or more larger openings which provide greater capacity at fully open conditions (e.g., utilizing an end plate as shown at 52' in FIG. 5).

Figure 17:
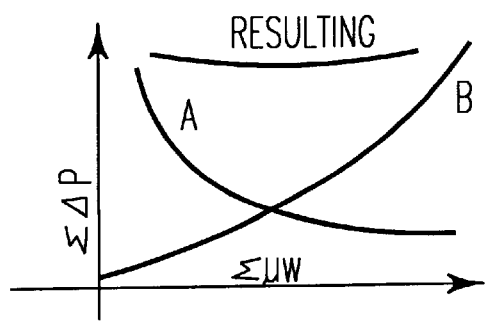
FIG. 17 is a graphical representation of the separate and combined impedance effects of the impedance assembly mounted to or with the closure member and the radial impedance assembly of FIG. 16B.

FIG. 17 graphically represents the attenuating effects of the arrangement shown in FIG. 16B, with the line A representing the variation of the pressure drop with the flow or opening position of the attenuator/impedance structures mounted with the closure element, and the line B representing the effect of the RPT attenuator structure 110. The "resulting" line reflects the combined effects of the attenuator structures.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters: Patent of the United States is:

1. A valve assembly comprising:
    a rotary closure member;
    an impedance assembly having a plurality of impedance structures, said plurality of impedance structures disposed such that when said rotary closure element is in a fully open position, said impedance structures are disposed in a flow passing through said valve such that a portion of said flow is directed onto said plurality of impedance structures and a portion of said flow is not directed onto said plurality of impedance structures;
    wherein each of said impedance structures includes an upstream portion and a downstream portion disposed at an angle with respect to said upstream portion, and wherein said downstream portions are spaced from one another in a first direction and said upstream portions are spaced from one another in a second direction, and further wherein said first direction is a direction of flow on an inlet side of said valve assembly when said rotary closure member is in a fully open position, and wherein said second direction is transverse to said first direction.

2. A valve as recited in claim 1, wherein said downstream portions of said impedance structures have semicircular peripheries.

3. A valve as recited in claim 2, wherein said downstream portions include a plurality of openings extending therethrough.

4. A valve assembly as recited in claim 2, wherein said upstream portions are substantially parallel to a flow direction when said rotary closure member is in a fully open position.

5. A valve assembly as recited in claim 4, wherein said impedance structures are mounted with said rotary closure member for movement with said rotary closure member.

6. A valve assembly as recited in claim 4, wherein said impedance structures are mounted within a valve housing and downstream of said rotary closure member.

7. A valve assembly as recited in claim 1, wherein said upstream portions are substantially parallel to a flow direction when said rotary closure member is in a fully open position.

8. A valve assembly as recited in claim 7, wherein said upstream portions are substantially planar.

9. A valve assembly as recited in claim 1, wherein said angle is an oblique angle.

10. A valve assembly as recited in claim 1, wherein said impedance structures are mounted with said rotary closure member for movement with said rotary closure member, and wherein said downstream portions are connected to an inner surface of said rotary closure member.

11. A valve assembly as recited in claim 1, wherein said impedance structures are disposed downstream from said rotary closure member, and wherein said downstream portions are connected to an inner surface of a valve housing.

12. A valve assembly as recited in claim 1, further including a radial passage impedance assembly disposed downstream of said impedance assembly, said radial passage impedance assembly including a plurality of passageways which extend in a radial direction and wherein said radial direction extends radially with respect to a flow axis direction, with said flow axis direction corresponding to a direction of flow on an inlet side of said rotary closure member when said rotary closure member is in a fully open position.

13. A valve assembly as recited in claim 1, wherein said upstream portions and said downstream portions of said impedance structures define a plurality of channels, and wherein each channel includes an upstream channel portion defined between adjacent upstream portions of said impedance structures, each channel further including a downstream channel portion defined between adjacent downstream portions of said impedance structures, and wherein fluid flows along said channels from said upstream channel portions to said downstream channel portions.

14. A valve assembly as recited in claim 1, wherein said upstream portions and said downstream portions of said impedance structures define at least one channel having an upstream channel portion defined between adjacent upstream portions of said impedance structures and a downstream channel portion defined between adjacent downstream portions of said impedance structures, and wherein fluid flows along said channel from said upstream channel portion to said downstream channel portion.

15. A valve assembly as recited in claim 14, wherein said impedance assembly is mounted for movement with said rotary closure member, and wherein said downstream portions of said impedance structures are connected to an inner surface of said rotary closure member such that said downstream channel portion terminates at said inner surface of said rotary closure member, and further wherein a plurality of apertures extend through at least one of said downstream portions of said impedance structures which define said at least one channel such that fluid flows along said channel from said upstream channel portion to said downstream channel portion and then exits said channel through said plurality of apertures.

16. A valve assembly as recited in claim 1, wherein said impedance assembly is disposed downstream from said rotary closure element, the valve assembly further including a radial passage impedance assembly which surrounds said impedance assembly.

17. A valve assembly comprising:
a rotary closure member;
an impedance assembly having a plurality of impedance structures, said plurality of impedance structures disposed such that when said rotary closure element is in a fully open position, said impedance structures are disposed in a flow passing through said valve such that a portion of said flow is directed onto said plurality of impedance structures and a portion of said flow is not directed onto said plurality of impedance structures;
wherein said impedance structures are mounted with said rotary closure element for movement with said rotary closure element and include upstream portions and downstream portions, and wherein, when said rotary closure member is in a filly open position, said downstream portions are at least partially disposed downstream of an axis of rotation of said rotary closure member, and further wherein said downstream portions extend at an angle with respect to said upstream portions.

18. A valve assembly as recited in claim 17, wherein at least one of said downstream portions is fully disposed downstream of said axis when said rotary closure member is in said fully open position.

19. A valve assembly as recited in claim 18, wherein a plurality of openings are provided in each of said upstream and said downstream portions of each of said impedance structures.

20. A valve assembly as recited in claim 18, wherein a plurality of openings extend through at least one of said upstream and downstream portions of each of said impedance structures.

21. A valve assembly as recited in claim 18, further including a radial passage impedance assembly disposed downstream of said impedance assembly, said radial passage impedance assembly including a plurality of passageways which extend in a radial direction and wherein said radial direction extends radially with respect to a flow axis direction, with said flow axis direction corresponding to a direction of flow on an inlet side of said rotary closure member when said rotary closure member is in a fully open position.

22. A valve assembly comprising:
a rotary closure member;
an impedance assembly having a plurality of impedance structures, wherein each of said plurality of impedance structures includes an upstream portion and a downstream portion extending at an angle with respect to said upstream portion, and wherein with respect to a flow direction when said rotary closure member is in a fully open position said downstream portions are spaced in said flow direction and said upstream portions are spaced in a direction substantially perpendicular to said flow direction; and
wherein said upstream portions and said downstream portions of said impedance structures define at least one channel having an upstream channel portion defined between adjacent upstream portions of said impedance structures and a downstream channel portion defined between adjacent downstream portions of said impedance structures, and wherein fluid flows along said channel from said upstream channel portion to said downstream channel portion.

23. A valve assembly as recited in claim 22, further including a radial passage impedance assembly disposed downstream from said impedance assembly, said radial passage impedance assembly including a plurality of passageways which extend in a radial direction and wherein said radial direction extends radially with respect to a flow axis direction, with said flow axis direction corresponding to a direction of flow on an inlet side of said rotary closure member when said rotary closure member is in a fully open position.

24. A valve assembly as recited in claim 22, wherein said downstream portions of said impedance structures each have an arcuate periphery.

25. A valve assembly as recited in claim 22, wherein said downstream portions of said impedance structures each have a semicircular periphery.

26. A valve assembly as recited in claim 22, wherein said impedance assembly is disposed inside of a valve housing.

27. A valve assembly as recited in claim 22, wherein said upstream portions and said downstream portions of impedance structures define a plurality of said channels.

* * * * *